Dec. 1, 1931.  F. LA GRANDE  1,834,407
REEL
Filed Oct. 17, 1929  2 Sheets-Sheet 2

INVENTOR.
Frank La Grande
BY
Riddle, Margeson and Homidge
ATTORNEYS.

Patented Dec. 1, 1931

1,834,407

UNITED STATES PATENT OFFICE

FRANK LA GRANDE, OF COYTESVILLE, NEW JERSEY, ASSIGNOR, BY MESNE ASSIGNMENTS, TO PARAMOUNT PUBLIX CORPORATION, A CORPORATION OF NEW YORK

REEL

Application filed October 17, 1929. Serial No. 400,211.

This invention relates to an improvement in reels and more particularly to what is known as rewind reels in the motion picture industry, and has for one of its objects the provision of a construction whereby two films may be wound simultaneously upon two reels driven from the one drive shaft, the construction being such that the tension in the films being rewound will be substantially constant irrespective of the differences in diameter which may exist in the supply reels from any cause.

Figure 1:
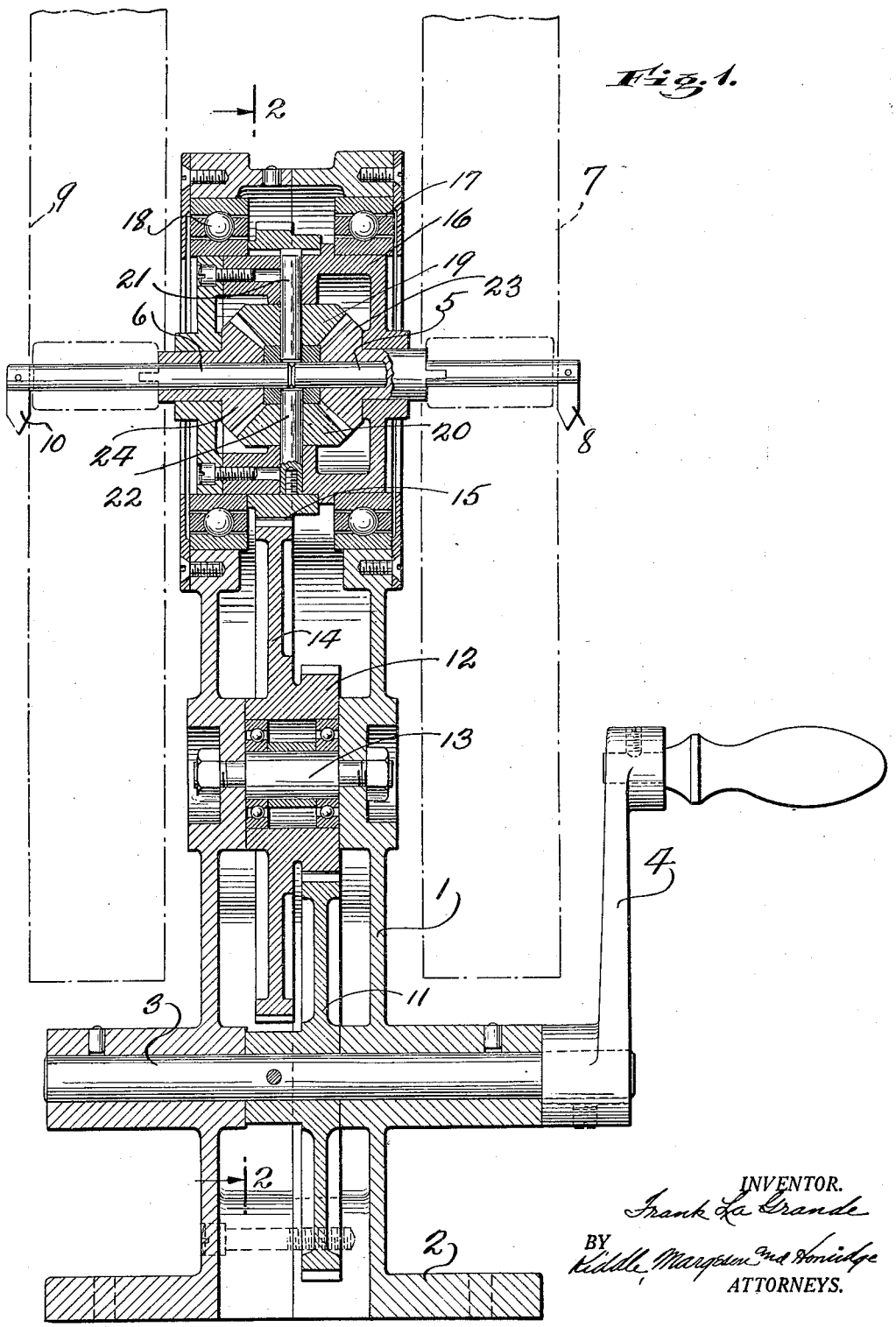
Figure 2:
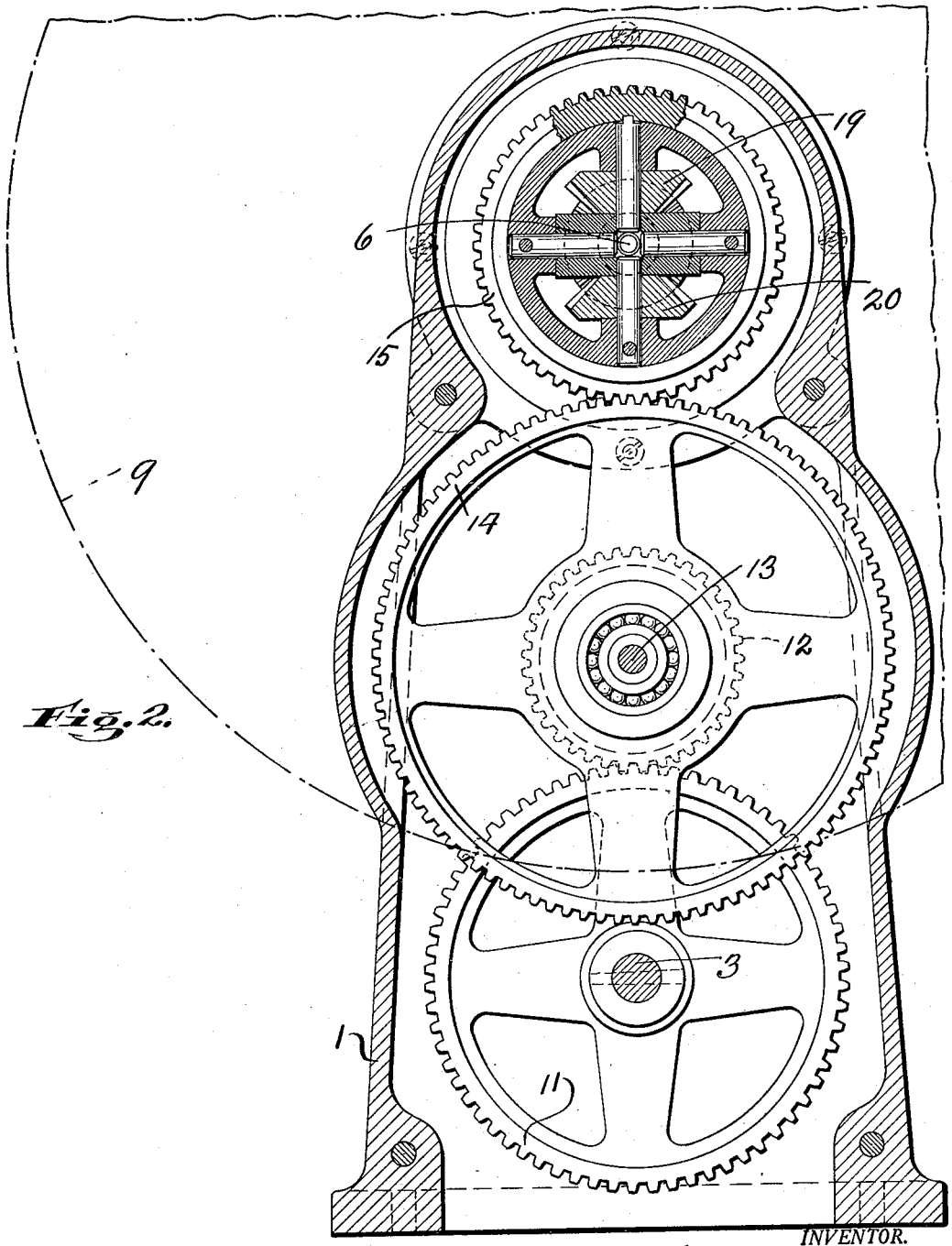

In the drawings wherein an embodiment of my invention has been illustrated, Fig. 1 shows the same in sectional elevation; and Fig. 2 in section, the section of Fig. 2 being taken on the line 2—2 of Fig. 1.

Referring to the drawings in detail, my invention provides a gear housing designated 1, and conveniently provided with a base 2 whereby the device may be readily supported on a table, stand, or other support.

In the lower part of the housing and extending transversely thereof is an operating or drive shaft 3 driven, as illustrated, by a hand operated crank 4.

Adjacent the upper part of the housing 1 are a pair of reel shafts 5 and 6, extending transversely of the housing and hence parallel to the operating or drive shaft 3. The reel shafts 5 and 6 are in alignment and have their inner ends adjacent each other. The outer end of the shaft 5 projects from the side of the housing 1 and receives a film spool 7, held in place on the shaft by a finger 8 which when the spool is in place is pivoted to the position shown on the drawings.

The outer end of the reel supporting shaft 6 receives a spool 9 which is held upon the shaft by a finger 10 similar to the finger 8.

The operating or drive shaft 3 carries a gear 11 mounted within the housing 1 and meshing with a gear 12 mounted immediately above it upon a shaft 13 extending transversely of the housing and lying parallel with drive shaft 3. The gear 12 is integral with a gear 14 mounted on the shaft 13.

The gear 14 meshes with a gear 15 provided on a differential housing 16 rotatable in bearings 17 and 18. Within the differential housing 16 and pinned thereto so as to move bodily therewith are a pair of mitre gears 19 and 20. The gear 19 is attached to the differential housing by pin 21 and gear 20 by pin 22. Intermediate the gears 19 and 20 and carried by the shafts 5 and 6, respectively, and meshing with these gears are mitre gears 23 and 24. The gears 19 and 20 as will be understood are rotatable on the pins 21 and 22, respectively, while the gears 23 and 24 are fast on the shafts 5 and 6, respectively.

In operation rotation of the drive shaft 3 through the handle 4 will impart motion to the gear 14 through gear 11 and intermediate gear 12, and through gear 15 and differential gears 19, 20, 23 and 24 will impart rotation to the shafts 5 and 6 and hence the spools 7 and 9 to drive these spools in the same direction. If, however, the tension on one of the films being wound should tend to exceed the tension of the film being wound upon the other spool or reel, it will be obvious that this will tend to slow up this reel or spool and simultaneously effect, through the differential gears, an increase in the speed of the other until the tension on both films is equalized.

It will be appreciated, therefore, that by providing the type of drive above described it is possible to wind films upon the spools or reels 7 and 9 simultaneously, irrespective of the diameter of the spools of film supplying these reels, while maintaining the tension upon the two films the same.

What I claim is:—

1. In a device of the class described, the combination of a pair of film reel or film spool supporting shafts, a drive shaft parallel thereto, a differential gear mechanism including a housing intermediate said spool supporting shafts, and a gear driven from said drive shaft for driving said housing to rotate said shafts.

2. In a device of the class described, the combination of a rotatable differential housing, differential gearing contained therein, a pair of aligned reel or spool supporting shafts extending into said housing and connected with the gears of said differential gearing, a drive shaft, a gear carried thereby, and an intermediate gear intermediate said last-mentioned gear and said differential housing gearing to provide a gear train from the drive shaft to said pair of shafts.

3. In a device of the class described, the combination of a gear casing, a drive shaft extending into the same, a gear on said shaft and fixed thereto and lying within said gear casing, a second shaft extending transversely of said gear casing and parallel to said drive shaft, a pair of gears carried by said second shaft, one of said gears meshing with the gear on the said drive shaft, a differential gear housing within said casing, a gear carried by said differential gear housing and meshing with one of said pair of gears, differential gearing within said differential housing and connected thereto, and a pair of spool or reel supporting ahafts extending into said differential housing and connected to the differential gearing therein, said last-mentioned shafts being in alignment with each other and lying parallel to said drive shaft and the second-mentioned shaft.

This specification signed this 15th day of October, 1929.

FRANK LA GRANDE.